INVENTOR.
C. M. KRON
BY Hudson & Young
ATTORNEYS

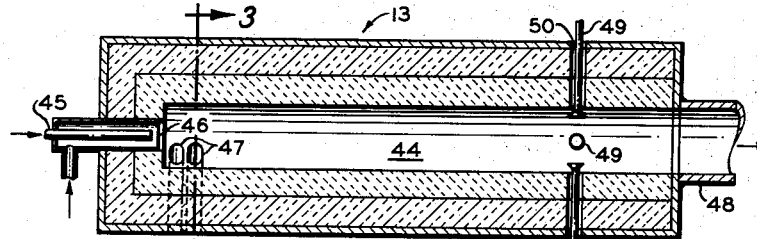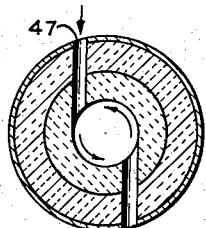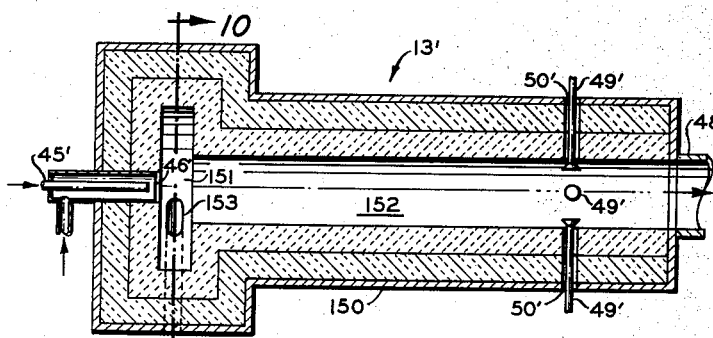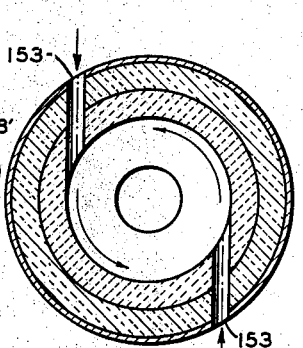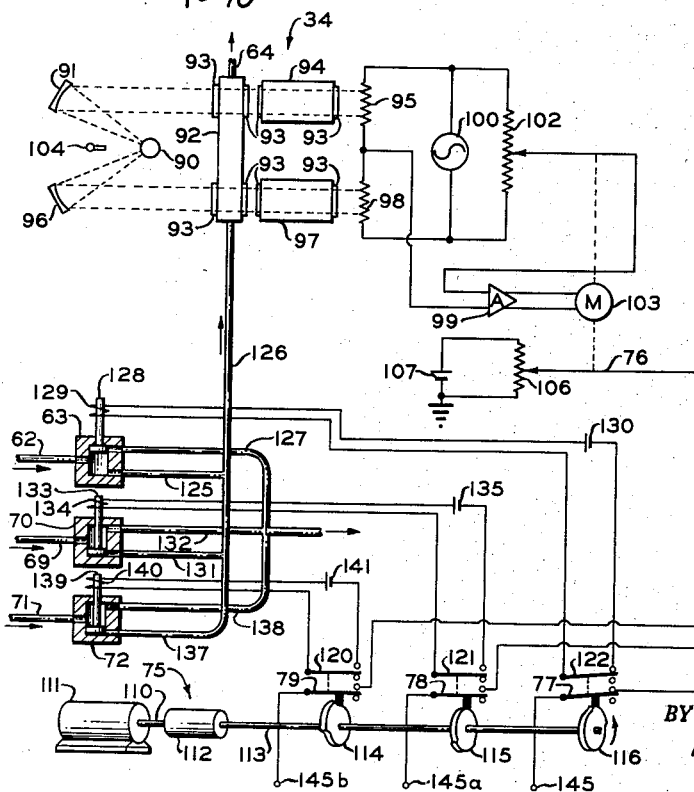

INVENTOR.
C. M. KRON
BY Hudson & Young
ATTORNEYS

United States Patent Office 2,953,436
Patented Sept. 20, 1960

2,953,436

METHOD FOR CONTROLLING CARBON BLACK FURNACES

Carl M. Kron, Borger, Tex., assignor to Phillips Petroleum Company, a corporation of Delaware Filed Apr. 14, 1955, Ser. No. 501,252

5 Claims. (Cl. 23—209.6)

This invention relates to a method of and apparatus for controlling carbon black producing operations.

In recent years the so-called "furnace" carbon blacks have become increasingly important because of their superior characteristics for use in rubber tires. The furnaces employed to produce these carbon blacks confine the combustion of a hydrocarbon fuel to a limited space. The air supplied is less than that required for complete combustion. The carbon-producing flames normally are quite large and in turbulent motion. After combustion, the carbon-laden gases are quenched and the carbon is separated from the gases by suitable means. In U.S. Patents 2,564,700 and 2,375,795, furnaces of this type are disclosed which preferably use hydrocarbon oils as conversion stocks. The oil is introduced axially into a cylindrical combustion chamber, and air or a combustible mixture is introduced in a direction tangential to the side wall of the chamber. The resulting carbon black is superior for many purposes to the blacks produced by other known methods.

In operating furnaces of these types, it is known that the quality of the conversion oil, the temperature in the furnace and the residence time of the combustible mixture in the reaction chamber affect the quality of the carbon black. Residence time and temperature are functions of feed rates to the furnace. Heretofore, it has been customary to control the quality of the produced carbon black by a Photelometer test. In such a test, two grams of the black is slurried with 50 milliliters of a transparent solvent such as chloroform, toluene, benzene, acetone, xylene or carbon tetrachloride. The slurry is heated to the boiling point in one to two minutes and then filtered. The filtrate is cooled and placed in the Photelometer cell. Radiation is passed through the cell and the transmission is measured. The percent transmission is referred to as the "Photelometer reading," and serves to indicate the tarry residue present in the carbon black. The feed rates to the furnace can be controlled in response to this reading to obtain a desired product. While this control procedure is satisfactory to produce a high quality black, the furnace operation may deviate from the desired conditions between the times the Photelometer tests are made. A closer degree of control is desirable.

In accordance with the present invention there is provided a method of controlling a carbon black furnace continuously and automatically. This control method is based upon the discovery that the composition of the effluent gas from the furnace is a definite function of the ratio of air to oil supplied to the furnace. In particular, it has been discovered that the concentrations of methane, acetylene and hydrogen in the effluent gas decrease as the air-oil ratio is increased. In accordance with this invention the air-oil ratio of the furnace is controlled in response to an analysis of the effluent gas from the furnace. Switching means are provided to control a plurality of furnaces sequentially from a single analyzer.

Accordingly, it is an object of this invention to provide a method of and apparatus for controlling a carbon black producing furnace in response to an analysis of the effluent gas from the furnace.

Another object is to provide apparatus to control a plurality of carbon black producing furnaces sequentially from a single analyzer.

A further object is to provide a method of and apparatus for varying the ratio of hydrocarbon to air supplied to a carbon black producing furnace to maintain a product of predetermined quality.

Other objects, advantages and features of the invention should become apparent from the following detailed description, taken in conjunction with the accompanying drawing, in which:

Figure 2 is a sectional view of one of the reactor furnaces of Figure 1;

Figure 3 is a sectional view taken along line 3—3 in Figure 2;

Figure 4 is a schematic detail view of an embodiment of the analyzer and timer of Figure 1;

Figure 9 is a sectional view of one of the reactor furnaces of Figure 8; and

Figure 10 is a view taken along line 10—10 in Figure 9.

Figure 1:
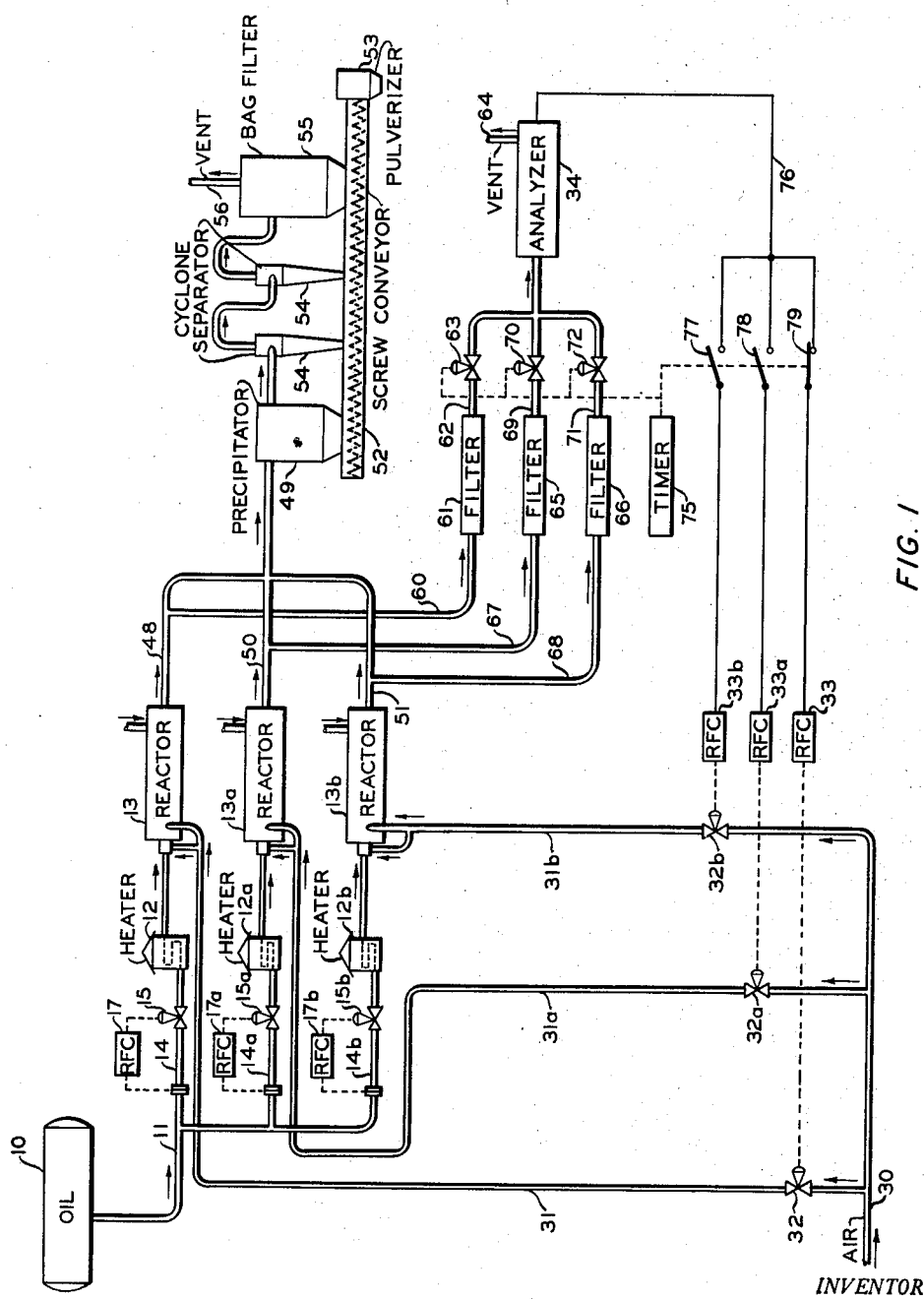
Figure 1 is a schematic representation of a first embodiment of the control system of this invention applied to carbon black producing apparatus.

Referring now to the drawing in detail, and to Figure 1 in particular, there is shown a hydrocarbon oil storage tank 10 having a conduit 11 connected thereto which supplies oil to a plurality of reactors. A conduit 14, having a valve 15 therein, communicates between conduit 11 and the inlet of a heater 12. Valve 15 is adjusted by a rate-of-flow controller 17 which is provided to maintain a predetermined flow through conduit 14. The outlet of heater 12 is connected to the axial inlet of a reactor 13. Conduits 14a and 14b, having respective valves 15a and 15b therein, communicate between conduit 11 and the inlets of respective heaters 12a and 12b. Valves 15a and 15b are adjusted by respective rate-of-flow controllers 17a and 17b. The outlets of heaters 12a and 12b are connected to the axial inlets of respective reactors 13a and 13b. Air is supplied to the reactors from a conduit 30. A first branched conduit 31, having a valve 32 therein, communicates with reactor 13. Valve 32 is adjusted by a flow controller 33 which is set by the output signal of an analyzer 34 in the manner described in detail hereinafter. A second branched conduit 31a, having a valve 32a therein, communicates between conduit 30 and reactor 13a. A third branch conduit 31b, having a valve 32b therein, communicates between conduit 30 and reactor 13b. Valves 32a and 32b are adjusted by respective flow controllers 33a and 33b which are also set by the output signal from analyzer 34.

One of the reactors 13 is illustrated in detail in Figures 2 and 3. This reactor comprises a cylindrical shell 43 which is lined with a refractory material having a cylindrical central passage 44 therein. Oil from heater 12 is supplied to chamber 44 axially at one end thereof by a nozzle 45 which is connected to conduit 14. A portion of the air supplied through conduit 31 enters chamber 44 axially through a tube 46 which surrounds nozzle 45. The remainder of the air enters chamber 44 in directions tangential to the side wall thereof through a plurality of passages 47 which communicate with conduit 31 at the outer ends thereof. A vent conduit 48 is secured to the second end of shell 43 to convey the reaction products to the carbon black recovery system shown in Figure 1. A plurality of nozzles 49 extend through radial passages 50 positioned downstream from the fuel and air inlets. Nozzles 49 suply a quench medium to chamber 44.

Oil and a small quantity of air are introduced axially into the reactor through respective nozzles 45 and 46. A considerably larger flow of air enters the reactor through passages 47. The axial oil enters the reactor at an elevated temperature, whereas the air is at approximately atmospheric temperature. The air admitted tangentially into the combustion chamber serves to direct the combustion products in a helical path about the periphery of chamber 44. A portion of the oil is burned to form a blanket of flame and combustion products along the reactor wall. The heat from this combustion serves to decompose the remaining oil to carbon black and gaseous by-products. The relatively small flow of axial air introduced concentrically to the axial oil prevents oxidation of the tip of burner 45 and also prevents carbon from depositing thereon. Water is introduced through nozzles 49 to quench the reaction products.

Referring again to Figure 1, the outlet conduit 48 of reactor 13 conveys the gaseous products into an electrical precipitator 49. The outlets of reactors 18 and 19 also communicate with precipitator 49 through respective conducits 50 and 51. Conduits 48, 50 and 51 can extend a substantial distance to provide additional atmospheric cooling of the gaseous products. Precipitator 49 serves to separate the carbon black from the effluent gases. The carbon black from precipitator 49 passes into a screw conveyor 52 which communicates with a pulverizer 53. The effluent gases are passed through one or more cyclone separators 54 which remove additional amounts of carbon black. The carbon black removed by separators 54 is also passed to pulverizer 53 by conveyor 52. The gaseous products pass through a bag filter unit 55 and are finally vented through a conduit 56. Any carbon black removed in unit 55 is also passed to pulverizer 53 by conveyor 52. The carbon black removed from pulverizer 53 is treated in a suitable manner for shipment, as by passage through a pellet mill, not shown.

A first sample line 60 communicates between outlet conduit 48 and the inlet of a filter 61. The outlet of filter 61 is connected by a conduit 62, having a valve 63 therein, to the inlet of analyzer 34. Filter 61 can be any suitable means capable of removing carbon black from the effluent gases. These gases are passed to analyzer 34 when valve 63 is open. The gases from analyzer 34 are vented through a conduit 64. In a similer fashion, outlet conduits 50 and 51 are connected to the inlets of respective filters 65 and 66 by respective conduits 67 and 68. The outlet of filter 65 is connected to analyzer 34 by a conduit 69 having valve 70 therein. The outlet of filter 66 is connected to analyzer 34 by a conduit 71 having a valve 72 therein. Valves 63, 70 and 72 are opened in sequence by a timer 75 which is illustrated in Figure 4. Analyzer 34 provides an output electrical signal which is connected by a lead 76 to first contacts of switches 77, 78 and 79. The second contacts of switches 77, 78 and 79 are connected to respective flow controllers 33b, 33a annd 33. Switches 77, 78 and 79 are also opened in sequence by timer 75. Switch 79 is closed when valve 63 is opened; switch 78 is closed when valve 70 is opened; and switch 77 is closed when valve 72 is opened. The output signal from analyzer 34 thus serves to regulate the flow of air into reactors 13, 13a and 13b.

As previously mentioned, it has been discovered that the composition of the effluent gas from the carbon black reactors is a definite function of the quality of the produced carbon black. The composition of the effluent gas is a function of the ratio of the air to oil fed to the furnaces. Thus, by measuring the composition of the effluent gases it is possible to adjust the air-oil ratio to control the individual furnaces to produce carbon black having desired qualities. In particular, it has been discovered that the amounts of methane, acetylene and hydrogen present in the effluent gases are definite functions of the air-oil ratio.

Figure 7:
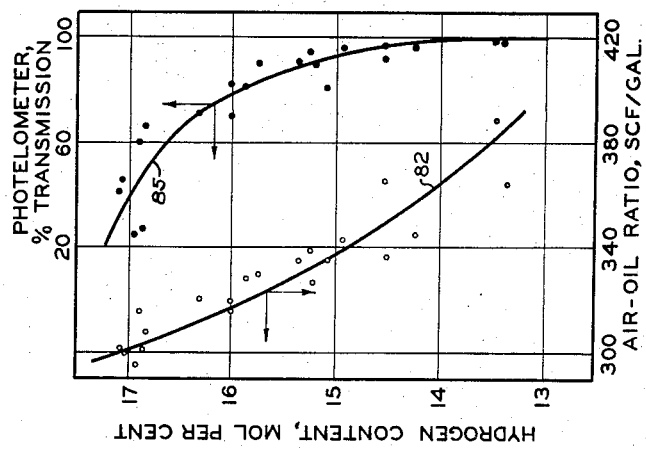
Figures 5, 6 and 7 are graphical representations of features of the control system of this invention.
Figure 6:
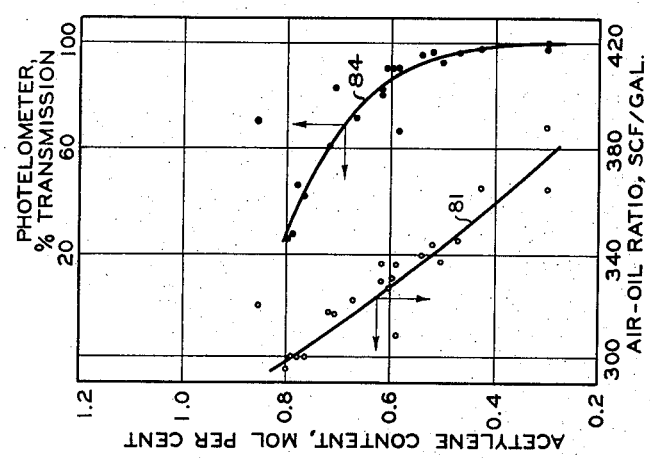
Figure 5:
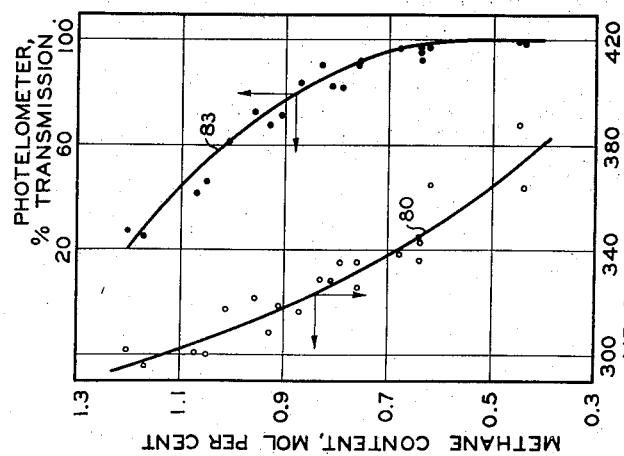

In Figure 5 a first curve 80 is plotted to show the relationship between the methane content of the effluent gases as a function of the air-oil ratio fed to a reactor. The methane content is plotted in terms of mol percent, and the air-oil ratio is plotted in terms of standard cubic feet of air per gallon of oil. The data utilized to plot this curve were obtained by analyzing the effluent gas from a reactor by a mass spectrometer. In Figure 6 curve 81 represents a similar plot of the acetylene content of the effluent gases. In Figure 7 curve 82 represents a similar plot of the hydrogen content in the effluent gases. Analyzer 34 is thus employed to measure the concentration of one of these components. If the control is based upon a measurement of either the methane or acetylene concentration, the analyzer illustrated in Figure 4 can be employed to advantage.

The analyzer illustrated in Figure 4 comprises a source of infrared radiation 90 which can be a heated metal wire. A first beam of radiation is directed from source 90 by a concave reflector 91 through a sample cell 92 having transparent windows 93. From cell 92 the beam is directed through a filter cell 94, which also has transparent windows 93. The radiation emerging from cell 94 impinges upon a first temperature sensitive electrical resistance element 95. A second beam of radiation from source 90 is directed by a second concave reflector 96 through a second pair of windows 93 in sample cell 92. From cell 92 the second beam passes through a compensating cell 97 having transparent windows 93. The radiation beam emerging from cell 97 impinges upon a second temperature sensitive electrical resistance element 98. First terminals of elements 95 and 98 are connected to one another and to the first input terminal of an amplifier 99. The terminals of a voltage source 100 are connected to the respective second terminals of elements 95 and 98. The end terminals of a potentiometer 102 are connected to the respective terminals of voltage source 100. The contactor of potentiometer 102 is connected to the second input terminal of amplifier 99. The output terminals of amplifier 99 are connected to a reversible servo motor 103. The drive shaft of motor 103 is mechanically coupled to the contactor of potentiometer 102.

If the analyzer is employed to detect the presence of methane, filter cell 94 is filled with methane or other material having infrared absorption characteristics approximating those of methane. Methane has a strong absorption band in the infrared spectrum between approximately 3.1 and 3.5 microns. Compensator cell 97 is filled with air or other transparent substance. The electrical bridge circuit initially is balanced, in the absence of a material being circulated through sample cell 92, by adjusting a light trimmer 104 until equal or predetermined quantities of radiation impinge upon elements 95 and 98. The contactor of potentiometer 102 is adjusted so that there is a zero input signal applied to amplifier 99 under this balanced condition. It should be evident that the radiation beam impinging upon element 95 is reduced in intensity by the radiation absorbed by the methane in filter cell 94. If a sample material containing methane is now circulated through cell 92, the radiation impinging upon element 95 remains unchanged because the radiation absorbed by the methane in the sample material is already absorbed by the methane in cell 94. However, the radiation impinging upon element 98 is reduced in intensity in proportion to the methane in sample cell 92 because of the radiation absorbed thereby. This reduced radiation impinging upon element 98 tends to lower the temperature thereof, which in turn changes the resistance of the element. This unbalances the bridge circuit so that an input signal is applied to amplifier 99.

The output signal of amplifier 99 drives motor 103 in a direction to move the contactor of potentiometer 102 until the bridge circuit is again balanced. The rotation of motor 103 necessary to effect this balance is thus a measurement of the methane content in the gas circulated through cell 92.

The drive shaft of motor 103 is also mechanically coupled to the contactor of a potentiometer 106. A voltage source 107 is connected across potentiometer 106. Movement of the contactor of potentiometer 106 thus changes the potential at a lead 108 which is connected to the contactor of potentiometer 106. Lead 108 represents the first output terminal of analyzer 34. The second output terminal of analyzer 34 can be the grounded first end terminal of potentiometer 106.

Timer 75 is also illustrated in Figure 4. The drive shaft 110 of a constant speed motor 111 is connected to the input of a gear box 112. The output of gear box 112 is connected to a shaft 113 which has cams 114, 115 and 116 mounted thereon. Cams 114, 115 and 116 are displaced 120° from one another on shaft 113. Switches 77, 78 and 79 are positioned to be operated by respective cams 114, 115 and 116, and switches 120, 121 and 122 are mechanically coupled to respective switches 79, 78 and 77. Valve 63 is illustrated schematically as having a single inlet passage and a pair of outlet passages. Conduit 62 communicates with the inlet passage. A conduit 125 communicates between the first outlet passage and a conduit 126 which is connected to the inlet of sample cell 92. The second outlet passage of valve 63 is connected to a vent conduit 127. A plunger 128 in valve 63 normally blocks the outlet passage communicating with conduit 125 in the absence of current being supplied to a solenoid 129. When current is supplied to solenoid 129, plunger 128 is lifted to block the outlet passage communicating with vent conduit 127. Solenoid 128 is connected in circuit with a current source 130 and switch 122.

The inlet of valve 70 communicates with conduit 69. The first outlet of valve 70 communicates with a conduit 131 which communicates with conduit 126. The second outlet of valve 70 communicates with a vent conduit 132. The plunger 133 in valve 70 is operated by a solenoid 134 which is connected in circuit with a current source 135 and switch 121.

The inlet of valve 72 communicates with conduit 71. The first outlet of valve 72 communicates with a conduit 137 which communicates with conduit 126. The second outlet of valve 72 communicates with a vent conduit 138. The plunger 139 in valve 72 is actuated by a solenoid 140 which is connected in circuit with a current source 141 and switch 120.

In the illustrated position, cam 116 is positioned to close switches 77 and 122. This results in solenoid 129 being energized so that the gas sample from reactor 13 is transmitted through conduits 62 and 126 to analyzer 34. Switch 77 is closed so that the output signal from analyzer 34 is transmitted by lead 76 to an output terminal 145 which is connected to flow controller 33 of Fig. 1. Controller 33 can be a conventional potentiometer controller which supplies an air pressure to operate valve 32. If desired, controller 33 can be a rate-of-flow controller in conduit 31 which is reset by the electrical signal from analyzer 34. Any of several commercially available controllers can be so employed. In this manner the flow of air to reactor 13 is regulated in response to an analysis of the effluent gas from reactor 13 to determine the methane content thereof. If the methane content should increase above a selected value, the flow of air into reactor 13 is increased by partially opening valve 32 to increase the air-oil ratio. This tends to reduce the methane content of the effluent gas, as indicated by curve 80 of Figure 5. If the methane content should tend to decrease, valve 32 is closed somewhat to decrease the air flow into reactor 13.

Prior to this invention, furnaces have been controlled by varying the air-oil ratio to provide a preselected Photelometer reading. In view of the discovery that the Photelometer readings are definite functions of the methane, acetylene and hydrogen content of the effluent gases, it is now possible to provide automatic control of the air-oil ratio by measuring the concentrations of these particular gases. The correlations between Photelometer readings and the concentrations of methane, acetylene and hydrogen are illustrated by respective curves 83, 84 and 85 of Figures 5, 6 and 7.

After a predetermined time, shaft 113 is rotated so that switches 78 and 121 are closed and switches 77 and 122 are opened. This results in the gas sample from the outlet of reactor 13a being applied to analyzer 34. The output signal from analyzer 34 is thus applied to an output terminal 145a which is connected to flow controller 33a. The air flow to reactor 13a is thus controlled in the manner previously described. After a second predetermined time, shaft 113 is rotated so that switches 79 and 120 are closed and switches 78 and 121 are opened. This results in a sample stream from the outlet of reactor 13b being supplied to analyzer 34. The output signal from analyzer 34 is applied to an output terminal 145b which is connected to flow controller 33b. The air flow to reactor 13b is thus controlled in the manner previously described. Motor 111 and gear box 112 rotate shaft 113 at a predetermined speed to pass the gas samples from the three reactors periodically to the analyzer. Flow controllers 33, 33a and 33b are set to maintain the selected air flows during the intervals that these individual controllers do not receive an output signal from analyzer 34.

If it is desired to control the reactors in response to a measurement of the acetylene concentration in the effluent gas, the analyzer of Figure 4 is employed in the same manner as previously described except that sample cell 94 is filled with acetylene or other material having infrared absorption characteristics approximating those of acetylene. Acetylene absorbs infrared radiation in the region of approximately 2.9 to 3.1 microns.

If it is desired to control the reactors in response to a measurement of the hydrogen concentration in the effluent stream, a suitable analyzer for the detection of hydrogen is employed in place of the illustrated infrared analyzer. This is necessary because hydrogen does not absorb infrared radiation. A mass spectrometer, for example, can be employed to determine the concentration of hydrogen in the effluent gas.

Figure 8:
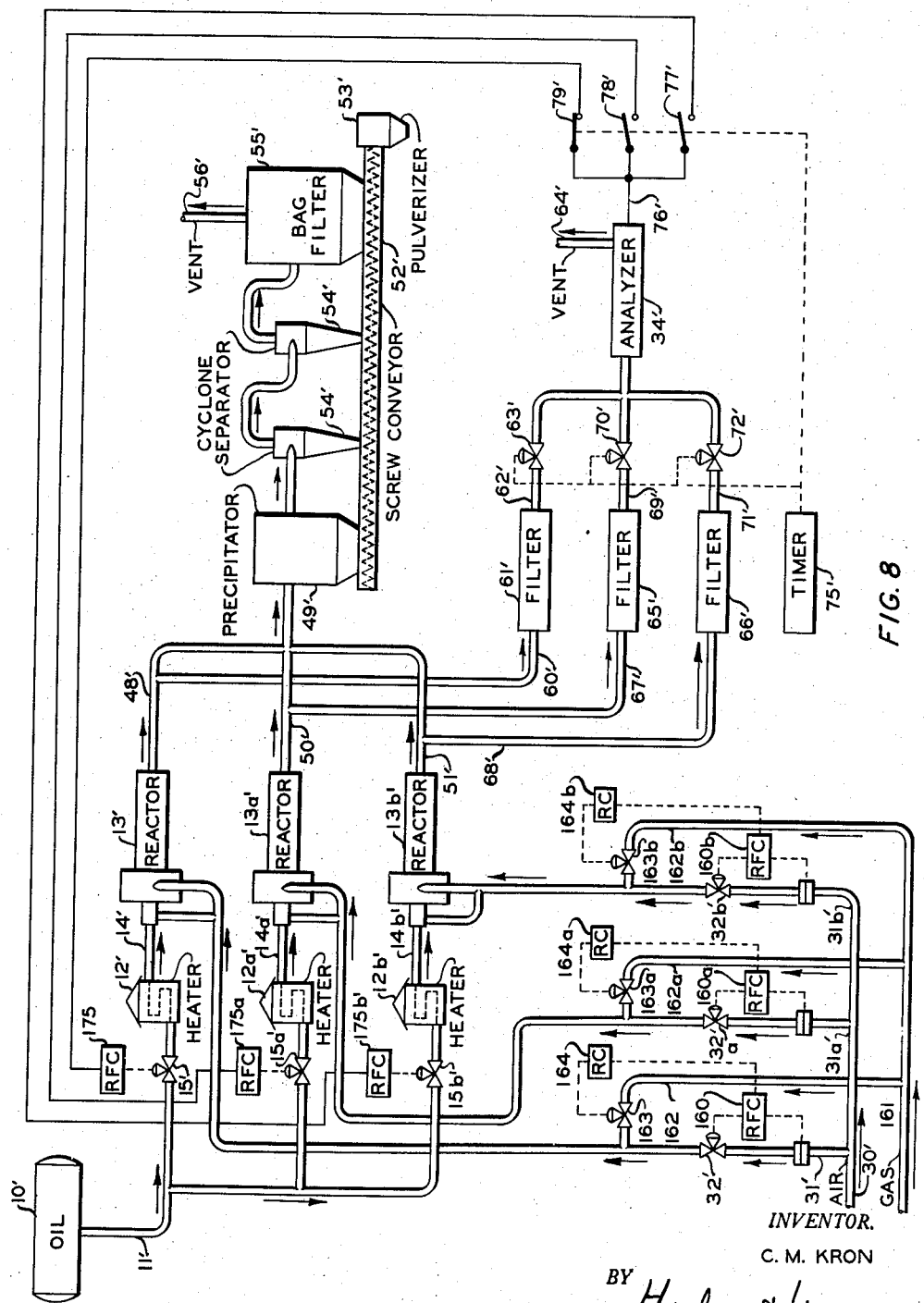
Figure 8 is a schematic representation of a second embodiment of the control system.

A second embodiment of the control system of this invention is illustrated in Figure 8. The carbon black producing system of Figure 8 is generally similar to that of Figure 1 and corresponding elements are designated by like primed reference numerals. The reactors 13', 13a' and 13b' can be of the form illustrated in Figures 9 and 10. Reactor 13' comprises a shell 150 enclosing a body of refractory material having first and second adjacent cylindrical passages 151 and 152. Passage 151 is of larger diameter than passage 152 and is adjacent the inlet portion of the furnace. Fuel and air are introduced into chamber 151 through respective nozzles 45' and 46' which correspond to the nozzles of reactor 13. A combustible mixture of gas and air is introduced into chamber 151 through passages 153 which are tangential to the side wall of chamber 151. Chamber 151 is designated as the combustion section and chamber 152 is designated as the reaction section. The combustible gases introduced through passages 153 are ignited to form a combustible mixture which contacts the axial hydrocarbon oil introduced through nozzle 45'. The combustion gases and the oil pass through the reaction section in a state of sufficient annular separation to prevent carbon deposition on the cylindrical wall of chamber 152. The hydrocarbon oil is converted or decomposed to carbon black by the heat supplied from the helical flow of combustion gases.

In the control sytem of Figure 8, air from conduit 30' is introduced into reactor 13' through a conduit 31' having a valve 32' therein. The flow of air through conduit 31' is maintained at a preselected rate by a rate-of-flow controller 160. A combustible gas is supplied by a conduit 161. A conduit 162, having a valve 163 therein, communicates between conduit 161 and conduit 31'. Gas is introduced into conduit 31' at a fixed rate which is proportional to the flow of air through conduit 31'. To this end, valve 163 is regulated by a ratio controller 164 which is energized by rate-of-flow controller 160. In a similar manner, gas is introduced into conduit 31a' from a conduit 162a having a valve 163a therein. Valve 163a is regulated by a ratio controller 164a which is energized by a rate-of-flow controller 160a which maintains a predetermined flow through conduit 31a'. Gas is introduced into conduit 31b' through a conduit 162b having a valve 163b therein. The passage of air through conduit 31b' is adjusted by valve 32b' which is controlled by a rate-of-flow controller 160b. Valve 163b is adjusted by a ratio controller 164b which is actuated by rate-of-flow controller 160b.

Valve 15' in oil supplying conduit 14' is controlled by a flow controller 175 which is energized by the output signal from analyzer 34' through switch 79'. Valve 15a' in conduit 14a' is adjusted by a flow controller 175a which is energized by the output signal from analyzer 34' through switch 78'. Valve 15b' in conduit 14b' is adjusted by a flow controller 175b' which is energized by the output signal from analyzer 34' through switch 77'.

The control system of Figure 8 operates in substantially the same manner as the system of Figure 1 to the extent that the air-oil ratio is adjusted in response to an analysis of the effluent gases. In the system of Figure 8, however, the air rate is maintained constant and the oil rate is adjusted to provide the desired ratio. Obviously, the two control systems can be interchanged with the two illustrated reactors.

From the following description of preferred embodiments of this invention it should be apparent that there is provided an improved method of an apparatus for controlling a carbon black producing furnace or a series of such furnaces in response to an analysis of the effluent gas therefrom. If the individual reactors all operate in substantially the same manner, the plurality of reactors can be controlled by single valves in the common reactant supply lines. If such a control system is found to be practical, the inlet of analyzer 34 can be connected directly to the vent conduit 56 from filter 55. However, in most commercial installations the individual reactors vary from one another by amounts so that the illustrated control system is desirable. It further should be apparent that the particular analyzer illustrated is not essential to satisfactory operation of this invention. Any instrument capable of detecting methane, acetylene or hydrogen in the effluent gas stream can be employed.

While the invention has been described in conjunction with present preferred embodiments for purposes of illustration, it should be evident that the invention is not limited thereto.

What is claimed is:

1. A method of controlling the operation of a carbon black producing furnace having a generally cylindrical reaction chamber, an axial inlet port to supply normally liquid hydrocarbon to be reacted, and a port tangential to the side wall of the chamber to supply air, which comprises measuring the concentration in the effluent gas from the furnace of a member selected from the group consisting of methane, acetylene and hydrogen, and regulating the ratio of air to hydrocarbon supplied to the furnace in response to the measurement to increase the ratio if the measured concentration increases and to decrease the ratio if the measured concentration decreases, thereby to maintain the measured concentration constant.

2. A method of controlling the operation of a carbon black producing furnace having a generally cylindrical reaction chamber, an axial inlet port to supply normally liquid hydrocarbon to be reacted, and a port tangential to the side wall of the chamber to supply air, which comprises measuring the concentration of methane in the effluent gas from the furnace, and regulating the ratio of air to hydrocarbon supplied to the furnace in response to the measurement to increase the ratio if the measured concentration increases and to decrease the ratio if the measured concentration decreases, thereby to maintain the measured concentration constant.

3. A method of controlling the operation of a carbon black producing furnace having a generally cylindrical reaction chamber, an axial inlet port to supply normally liquid hydrocarbon to be reacted, and a port tangential to the side wall of the chamber to supply air, which comprises measuring the concentration of acetylene in the effluent gas from the furnace, and regulating the ratio of air to hydrocarbon supplied to the furnace in response to the measurement to increase the ratio if the measured concentration increases and to decrease the ratio if the measured concentration decreases, thereby to maintain the measured concentration constant.

4. A method of controlling the operation of a carbon black producing furnace having a generally cylindrical reaction chamber, an axial inlet port to supply normally liquid hydrocarbon to be reacted, and a port tangential to the side wall of the chamber to supply air, which comprises measuring the concentration of hydrogen in the effluent gas from the furnace, and regulating the ratio of air to hydrocarbon supplied to the furnace in response to the measurement to increase the ratio if the measured concentration increases and to decrease the ratio if the measured concentration decreases, thereby to maintain the measured concentration constant.

5. A method of producing carbon black which comprises passing a normally liquid hydrocarbon axially into a cylindrical reaction zone, passing air into the reaction zone in a direction tangential to the side wall thereof, measuring the concentration in the effluent gas from the reaction zone of a member selected from the group consisting of methane, acetylene and hydrogen, and regulating the ratio of air to hydrocarbon supplied to said zone in response to the measurement to increase the ratio if the measured concentration increases and to decrease the ratio if the measured concentration decreases, thereby to maintain the measured concentration constant.

References Cited in the file of this patent

UNITED STATES PATENTS

| | | |
|---|---|---|
| 1,644,123 | Griswold | Oct. 4, 1927 |
| 2,368,828 | Hanson et al. | Feb. 6, 1945 |
| 2,667,410 | Pierce | Jan. 26, 1954 |
| 2,702,238 | Hays | Feb. 15, 1955 |
| 2,773,349 | Bolo et al. | Dec. 11, 1956 |